United States Patent
Kalima

(10) Patent No.: US 8,894,244 B2
(45) Date of Patent: Nov. 25, 2014

(54) TRANSMISSION TYPE OPTICAL ELEMENT, LIGHTING ARRANGEMENT, AND METHOD FOR MANUFACTURING

(75) Inventor: Valtteri Kalima, Joensuu (FI)

(73) Assignee: Nanocomp Oy Ltd, Lehmo (FI)

( * ) Notice: Subject to any disclaimer, the term of this patent is extended or adjusted under 35 U.S.C. 154(b) by 0 days.

(21) Appl. No.: 13/807,171

(22) PCT Filed: Jul. 1, 2010

(86) PCT No.: PCT/FI2010/050567
§ 371 (c)(1),
(2), (4) Date: Dec. 27, 2012

(87) PCT Pub. No.: WO2012/001214
PCT Pub. Date: Jan. 5, 2012

(65) Prior Publication Data
US 2013/0100656 A1 Apr. 25, 2013

(51) Int. Cl.
*F21V 9/00* (2006.01)
(52) U.S. Cl.
CPC ..................................... *F21V 9/00* (2013.01)
USPC .......................................... 362/293; 362/208
(58) Field of Classification Search
CPC .......................................................... F21V 9/00
USPC ........................................................ 362/208
See application file for complete search history.

(56) References Cited

U.S. PATENT DOCUMENTS

| | | | | |
|---|---|---|---|---|
| 6,069,737 | A * | 5/2000 | Fetzer et al. | 359/558 |
| 6,765,724 | B1 * | 7/2004 | Kramer | 359/566 |
| 2004/0196516 | A1 | 10/2004 | Petersen | |
| 2005/0042391 | A1 | 2/2005 | Ryan | |
| 2005/0162543 | A1 | 7/2005 | Kobayashi | |
| 2006/0056065 | A1 | 3/2006 | Schilling | |
| 2007/0153495 | A1 | 7/2007 | Wang | |
| 2008/0080850 | A1 | 4/2008 | Amirzadeh | |
| 2009/0278979 | A1 * | 11/2009 | Bayerl et al. | 348/371 |
| 2009/0291206 | A1 | 11/2009 | Jiang | |
| 2010/0165464 | A1 * | 7/2010 | Lin et al. | 359/570 |
| 2013/0044375 | A1 * | 2/2013 | Schnieper et al. | 359/558 |

FOREIGN PATENT DOCUMENTS

| | | |
|---|---|---|
| EP | 1 519 249 | 3/2005 |
| JP | 3 607281 | 1/2005 |

OTHER PUBLICATIONS

International Search Report for PCT/FI2010/050567.
International Search Report for EP 13 17 3572.

* cited by examiner

*Primary Examiner* — Mary Ellen Bowman
(74) *Attorney, Agent, or Firm* — Fay Sharpe LLP

(57) ABSTRACT

A transmission type optical element (10) comprises a surface relief micro-grating (5, 9) for guiding light (13) propagating through the optical element. According to the present invention, at least a portion (5) of the thickness of the optical element (10) is formed of a colored material (4) so as to make the optical element colored.

20 Claims, 4 Drawing Sheets

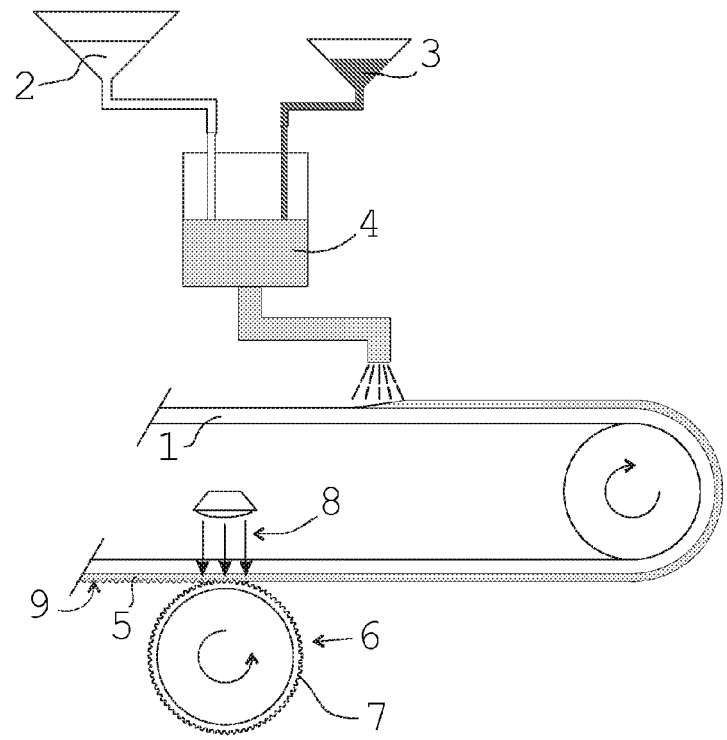
Fig. 1 (not in scale)
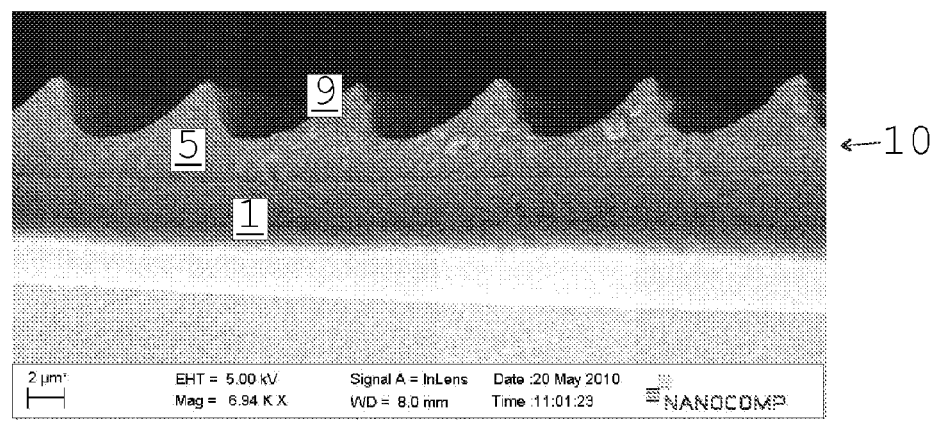
Fig. 2

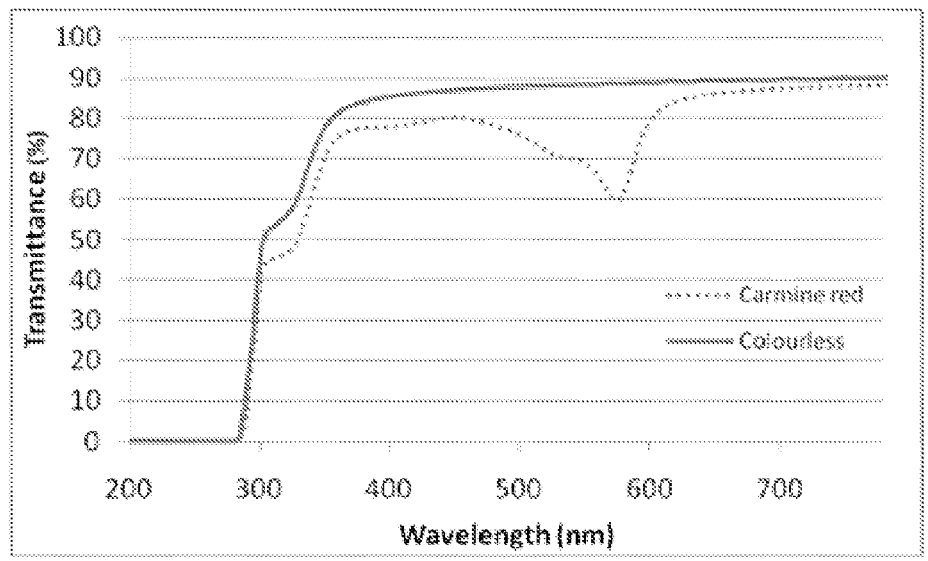
Fig. 3
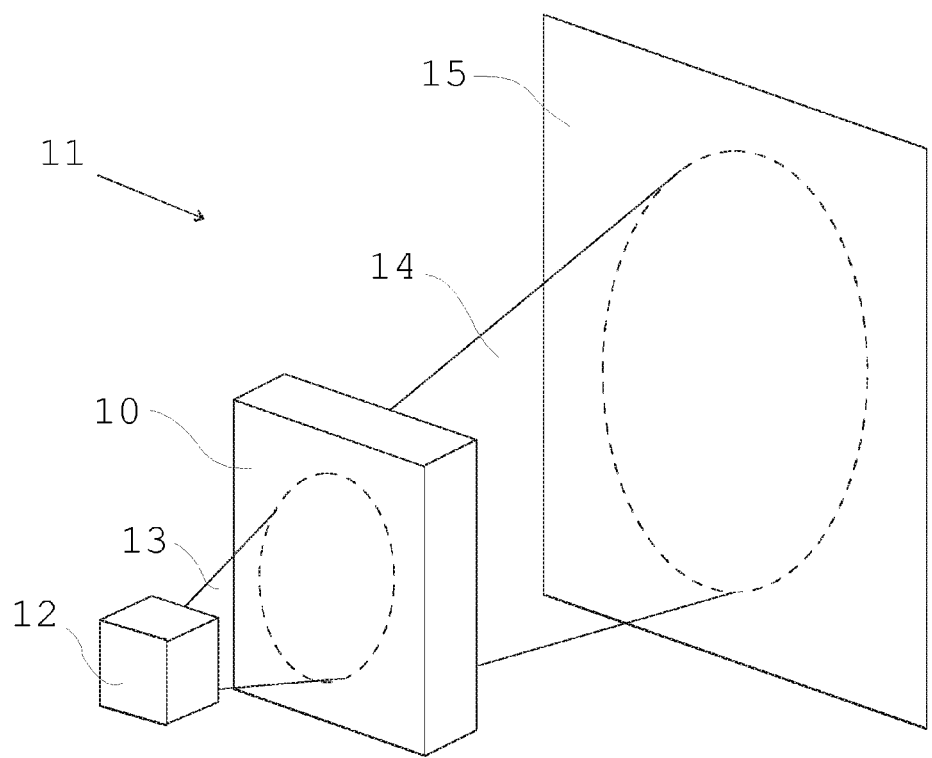
Fig. 4 (not in scale)

TRANSMISSION TYPE OPTICAL ELEMENT, LIGHTING ARRANGEMENT, AND METHOD FOR MANUFACTURING

FIELD OF THE INVENTION

The invention is related to micro-optics, particularly to optical elements comprising micro-scaled optical gratings, lighting arrangements utilizing such elements, and manufacturing thereof.

BACKGROUND OF THE INVENTION

By micro-optics is meant here a field of optics where the operation of the optical elements used to guide light is not only based on macroscopic geometries of the element surfaces and thus on the overall three-dimensional shapes thereof but, first of all, on microscopic gratings extending on the element surfaces. When the optical performance is primarily determined by the grating structure, the overall shape of the element can be simple. For example, the element surfaces do not need to be curved like in conventional lenses but the grating can lie on a flat surface. This allows implementing the element bodies e.g. as flat plates with low thickness. Actually, the micro-optical elements are usually manufactured as thin film structures.

Micro-optics meant here covers both refractively operating grating structures and light manipulation by means of diffractive gratings. Diffractive optics forms a particular field of micro-optics. In diffractive optics, the operation of the optical elements are no more based on refraction of light ray at an interface between two materials having different optical densities as is the case in the refractive optics but, instead, on diffraction of light. In diffractive optical elements, the size of the structural details of the grating is in or below the magnitude of the wave-length of light.

Micro-optics is increasingly expanding into different application areas. One of its advantages is that the performance characteristics of the optical elements are variably and flexibly adjustable. On the other hand, development of the manufacturing techniques enables nowadays cost-effective mass production of micro-optical elements by different replication techniques. The general principle in these replication methods is that an inverse copy of the desired grating comprising micrometer-scaled or smaller three dimensional structures is provided in a particular mold/pressing tool which is used to press the grating structure on the surface of a suitable grating material.

As stated above, micro-optical elements are often manufactured as thin film structures. In a typical approach, a layer of liquid material, for example a suitable thermosetting resin, which is curable by ultraviolet (UV) light or by heat, is spread on a thin support/base film. The pressing tool is pressed on the thin film comprising the layer of the curable material and UV radiation or heat is directed simultaneously to the pressing point to cure the grating material. Because the dimensions of an individual micro-optical element are typically on the order of a few millimeters, it is possible to press by such a method a large number of elements in one film from which the individual elements are later cut off.

One of the most useful practical applications of the manufacturing principles presented above is a UV roll-to-roll process. In this approach, the pressing tool is arranged on the surface of a cylindrical roll/rod which rotates about its longitudinal axis, and the pressing takes place as a continuous process on a film which is led past the roll. The base film is coated by a UV curable resin, and UV radiation is directed to the point of contact of the pressing roll and the film.

The mass production methods described above are especially suitable for applications which require low cost micro-optical elements, which is the case for example in different consumer products. A typical example is a plastic flashlight lens of a digital camera or of an integrated camera element of e.g. a mobile phone.

Requirements for the material properties of the micro-optical elements are set primarily by the desired optical performance of the element. For example, a lens designed for visible light should have a high transmittance at the visible light wavelengths. Transmittance should also be uniform over said wavelength range. In other words, the lens should be transparent and optically clear without any coloring effect. This is usually the case also in spectroscopic applications where different wavelengths are specifically tried to be controlled in different manners. Differentiation between the wavelengths is realized by means of the actual grating structure, the performance of which is specifically dependent on the wavelength, the material itself being colorless.

However, particularly in consumer products, the appearance of all the visible parts of a device is also becoming increasingly important. In other words, besides its optical performance, it would be advantageous if a flash lens of a camera in portable devices of said type matched in appearance to the general appearance of the device cover. For example, it would be desirable if the lens could be tinted to match the general coloring of the device. Coloring of the optical element is not only relevant in flashlight arrangements but also applies to many other lighting arrangements. On the other hand, for example in mobile phones which are particularly critical in their appearance, it can be considered as something of a flaw or a disturbing factor if the LED element producing the flashlight shows through the lens. Suitable coloring of the lens could blot out the LED so as to be less noticeable.

Accordingly, there is a definite need of colored micro-optical elements and lighting arrangements utilizing such elements. However, the coloredness of the element should not affect substantially the primarily intended optical function of the element. Moreover, it should be possible to implement the coloredness of the micro-optical element cost-effectively as part of the normal mass production process of the elements.

PURPOSE OF THE INVENTION

The purpose of the invention is to respond to the need presented above.

SUMMARY OF THE INVENTION

The present invention is characterized by what is presented in claims 1, 4 and 8

One essential issue common for each aspect and embodiment of the present invention relates to colors and coloredness of objects, particularly optical elements.

In context of this invention, by coloredness is primarily meant the appearance of the optical element as perceived by the human eye. A well-transmitting and optically clear element between the eye and the viewed object does not affect much the visual perception of the object otherwise than as a result of refraction of light possibly caused by the shapes of the surface of the element. The more planar the element is and the more flat surfaces it has, the less imperceptible the element is. If the material of such element is colored, reflection of light from the element at wavelengths corresponding to the coloring is increased in comparison to the other wavelengths. A human eye perceives such an element being colored. At the same time, the objects behind the element do not show as clearly as in the case of a clear, i.e. colorless element.

According to one aspect, the present invention is focused on a transmission type optical element comprising a surface relief micro-grating for guiding light propagating through the element.

A surface relief micro-grating means here a three dimensional periodic surface relief structure having a grating period less than or equal to 100 µm. A simple example of the grating is a Fresnel lens type grating consisting of a sequence of adjacent inclined facets on a surface of a thin film, the inclination of the facets changing across the grating. The grating can also be a diffraction grating, the optical performance of which being based on, at least partially, diffraction of light, and the characteristic features of the grating corresponding to the magnitude of the wavelength of light to be guided by the element. The surface relief grating can lie on a free surface of the element. Alternatively, it can be embedded within a layered element structure.

Transmission type operation of the optical element of the present invention means that the element has to be formed of one or more transparent materials. By transparency of materials, films, and layers is here meant that with the selected film/layer thickness, at least 50% of the incident radiation power at the relevant wavelength range is transmitted through the film/layer.

In principle, the optical element of the present invention can be formed of any transparent material(s) suitable for industrially applicable grating manufacturing processes like the replication processes.

According to the present invention, at least a portion of the thickness of the optical element is formed of a colored material so as to make the optical element colored.

In context of this invention, by coloredness is primarily meant the appearance of the optical element as perceived by the human eye. Thus, by colored optical element is meant here that the reflectance spectrum of the element in the visible wavelength range deviates from a flat one in a way that, as the result of the reflectance spectrum and the wavelength dependency of the sensitivity of an average human eye, when the overlaying layer is illuminating by white light, a human eye experiences the reflected light colored, i.e. non-white.

A colored optical element provides great advantages over the prior art solutions. First, the optical element can be tinted to match the general coloring of the device, a part of which it forms. On the other hand, a colored element can at least partially blot out what is behind the diffractive optical element. These features can be very important e.g. in consumer product applications. When the coloredness of the component is implemented by a colored portion of the element itself instead of e.g. additional colored reflective films, the construction of the element can be kept simple.

The portion of the thickness of the element comprising colored material can vary. It is possible to have the entire element formed as a single layer of a material being throughout colored. For example, there are commercially available ready-colored films suitable for forming a grating thereon by e.g. hot embossing. On the other hand, the element can be formed as a layered structure with only one or some of the layers being colored.

The coloredness of the colored material can be an inherent property of the material itself. On the other hand, in a more flexible approach the coloredness is achieved by means of color agent inserted in the material to be colored. The actual coloredness of the colored material is then determined by the type and amount of the color agent therein. By color agent is here meant a substance which, when present in the material of the optical element, preferably does not have any substantial effect on the material properties other than the optical ones. In other words, the properties other than the optical ones of the optical element material would be substantially similar also without the presence of the color agent. In this sense, the color agent here discussed is an additive.

In a preferred embodiment, the optical element is formed as a thin film structure having a thickness less than or equal to 1 mm. As a compact-sized plate-like construction, a thin film optical element can be flexibly integrated in various devices. Moreover, a thin film structure can be manufactured by means of efficient replication processes.

In a preferred embodiment, the optical element comprises an optically clear base layer and an overlaying layer lying on the base layer, the micro-grating being formed on the surface of the overlaying layer which is opposite to the surface of the overlaying layer facing towards the base layer, the overlaying layer material comprising color agent so as to make the optical element colored. This layered structure provides many advantages. First, when implementing the coloredness by means of color agent present in the overlaying layer only, one can use standard-type clear, i.e. non-colored base layer films available with reasonable prices. From manufacturing point of view, the coloring can be made flexibly at the stage of forming the overlaying layer as is discussed more later in this document.

The base layer thickness does not have a great impact on the element optical performance. Most suitable thicknesses lie in the range of 50-600 µm, depending on the application at issue and the manufacturing process used to produce the element. In general, the base layer can be implemented according to the principles known in the art.

Between the base layer and the overlaying layer there can be also one or more additional layers, for example for promoting adhesion between the layers or facilitating the manufacturing process of the element. On the other hand, additional layer(s) purposed e.g. to protect the base layer from scratching can be formed on the back surface of the layer. Also antireflective coatings are possible. Some commercially available base layer films have these kinds of additional layers integrated thereon.

Also the material of the overlaying layer can be, in principle, any known grating material, the criteria for material selection being primarily set by the used manufacturing process and compatibility with the base layer material. Surface relief gratings are nowadays most efficiently manufactured by printing or molding techniques. Depending on the actual manufacturing process, examples of suitable materials include lacquers curable by ultraviolet light (UV), heat, and/or e.g. humidity. A great variety of these kinds of materials is commercially available. Optimal overlaying layer thickness depends on e.g. the profile of the grating structure and the printing/molding process used. Usually, as low thickness as possible is desired. The thickness of the overlaying layer can lie e.g. in the range of 0.5-200 µm.

The actual composition of the color agent of the optical element according to the present invention depends, naturally, on the material to be colored. These two substances must be compatible with each other. For example, for different lacquers suitable for manufacturing gratings by printing processes there are commercially available also compatible inks with large scale of tones.

It is important to note that the coloredness, i.e. the spectrally non-uniform reflectivity of the optical element should not disturb the actual designed optical performance of the optical element. Particularly, when the optical element is designed to operate over a wide wavelength range of the incident light, the coloredness should not change the designed spectral characteristics of the optical performance of the element. Neither should the coloredness deteriorate the clarity of the optical element by decreasing the transmittance through the element. Again, the issue of changing the optical performance should be considered primarily from the human eye experience point of view. In other words, the relevant question is whether the human eye experiences observable changes in the spectral performance of the optical element. In the context of the present invention, by human eye is meant a theoretical average human eye as it is understood in the field of color optics where different standards for modeling the coloredness experienced by the human eye have been determined. These standards take into account the non-uniform spectral response of the human eye. One example of these model systems is the CIE L*a*b* system, often abbreviated simply as "CIELAB". It is perhaps the most complete color space specified by the International Commission on Illumination (Commission Internationale d'Eclairage, hence its CIE initialism). It describes all the colors visible to the human eye and was originally created to serve as a device independent model to be used as a color reference.

Naturally, the effect of the coloredness of the grating material can be taken into account in the grating design so that the wavelength dependency of the grating performance is adjusted to compensate the effect of the grating material coloredness. This is, however, a challenging and burdensome way to proceed. A more preferred approach is to implement the coloredness of the optical element in a way which preserves the original coloredness, as experienced by the human eye, of light propagating through the optical element and interacting with the diffraction grating therein substantially unchanged. In many applications, the functional portions of a micro-grating consist of structures in a size class which is clearly greater than the visible light wavelengths. Then it is possible to design and implement grating structures which operates substantially equally through the entire range of visible light wavelengths. On the other hand, with suitable thickness of the colored portion of the optical element and the color agent concentration therein, i.e. with sufficiently low total amount of the color agent, the coloredness does not appreciably affect the total transmittance of the optical element, so that the total losses of optical power caused by coloring can be kept practically insignificant.

The advantages of the inventive idea of the present invention are very beneficial in a lighting arrangement according to a second aspect relating to the present invention. The lighting arrangement comprises a primary light generating element and a lens redistributing, i.e. collecting and directing, according to a predetermined manner, the light initially emitted by the light generating element. The lighting arrangement can be, in principle, of any type. Examples include different types of lighting devices for general indoor and outdoor lighting applications as well as specific lighting devices e.g. in automotive or industrial applications. On the other hand, the lighting application can be integrated in a portable electronic device like a mobile phone.

According to the present invention, the lens of the lighting arrangement comprises an optical element according to the first aspect of the present invention described above.

The appearance of a lighting arrangement according to the present invention can be flexibly adjusted as desired by properly selected toning of the lens. By appearance is here meant, naturally, the appearance of the optical element when the primary light generating element is not operating, i.e. is not emitting light. The color of the lens can be selected to be compatible with the overall coloring of the device, e.g. a consumer luminaire or a mobile phone, a part of which the lighting arrangement forms. On the other hand, colored lens also makes the light generating element less visible when observed through the lens.

In a preferred embodiment of the lighting arrangement according to the present invention, the light generating element comprises a light emitting diode LED. For example, the effect of blotting out the light generating element, i.e. making it less visible when observed through the lens, is valuable because the LEDs often appear slightly yellowish and thus undesirably eye-catching. One particular advantage achievable by this embodiment relates to white LEDs. At the periphery of the emitted light beam, the color of the light emitted by white LEDs is often slightly colored, typically yellowish. With suitably selected coloredness of the optical element, the colored material thereof can absorb the wavelengths of the undesirably colored portion of light, thus enhancing the whiteness of the light beam. This kind of LED-based lighting arrangement can be used e.g. in a luminaire for general lighting purposes. As another example, it can be a LED-based flashlight arrangement.

One group of cases where the above-discussed preservation of the original coloredness of the light is especially important is formed by lighting arrangements designed to produce white light. Thus, in one preferred embodiment of the lighting arrangement according to the present invention, the light generating element is configured to produce white light, and the thickness of the portion of the element formed of a colored material and the color intensity thereof are selected to preserve the color of light redistributed by the lens white. Whiteness here can be defined by any one of said known models or standards, e.g. the CIELAB system. These standards usually define a particular range in which the light is substantially white to the human eye. That range allows within it certain variations of intensity which are characteristic of each wavelength. The key principle in this embodiment is that the colored material thickness and the color intensity thereof are kept within ranges by which the effect of the color agent on the transmission spectrum of the overlaying layer does not deflect the color of incident white light from the range where the human eye experiences the color being white. Naturally, a color agent always changes the transmission spectrum of the overlaying layer to some degree. However, the inventors have found that for the coloredness experienced by human eye, it is possible to have the colored layer thickness and the color agent concentration in the optical element selected so as to, though making the reflectance of the overlying layer colored, still preserve the whiteness of the light emitted by the white light generating element and propagated through the optical element. The actual thickness and the color agent concentration depend on many factors including e.g. the type of the color agent and the spectrum and intensity of the light emitted by the light generating element and thus no generally valid values can be given.

The white light producing lighting arrangement described above can be e.g. a lighting arrangement to produce general indoor or outdoor illumination. It can be also a flashlight arrangement where preservation of whiteness of the light is very important in order to avoid distortion of colors in the figure shot by a camera.

The beneficial features of the white light producing lighting arrangement described above are particularly advantageous in a preferred embodiment wherein the lighting arrangement is a LED-based (Light Emitting Diode) flashlight arrangement where the light generating element comprises a LED to produce the high brightness flashlight pulses. In addition to ordinary digital cameras, these kinds of LED-based flashlight arrangements are used e.g. in mobile phones and other portable electronic devices having an integrated camera. It is a common feature of these kinds of devices that the appearance of the device is very important. This means that the flashlight lens as a part of the device cover must be not only technically valid but it should also look good. On the other hand, it can be considered as something of a flaw or a disturbing factor if the LED element producing the flash is clearly visible through the lens. This embodiment provides a solution for both of these aspects. The flash lens can be tinted to match to the overall coloring of the device cover. At the same time, the coloredness of the lens blots out the LED behind the lens so as to be practically imperceptible to the user of the device. High brightness white LEDs suitable for flashlight applications are nowadays commercially available with a great variety in the component details. It is straightforward to use a this kind of component as the primary light generating source and implement the coloredness of the flash lens according to the present invention so that the whiteness of the light produced by the LED is not destroyed. Moreover, as being typically consumer products, electronic devices having an integrated camera and a LED-based flashlight arrangement thereto attached are usually very critical in their manufacturing costs. The present invention, particularly in the case of a thin film construction of the optical element, provides an efficient solution also from this point of view.

A third aspect of the present invention is related to a method for manufacturing a transmission type micro-optical element comprising a surface relief micro-grating for guiding light propagating through the optical element. According to the present invention, at least a portion of the thickness of the optical element is formed of a colored material so as to make the optical element colored.

What is discussed above concerning the details of the diffractive optical element structure, materials, and applications, apply respectively also to the manufacturing method aspect of the present invention. Conversely, the disclosure below explaining the method according to the present invention and the embodiments thereof, applies vice versa, to the appropriate extent, to the diffractive optical element and the lighting arrangement aspects of the present invention.

The method of the present invention provides a very efficient and flexible way to implement colored micro-optical elements. As described above concerning the lighting arrangement aspect of the present invention, with proper selection of the thickness of the element formed of a colored material and the color intensity, the desired coloredness can be achieved without substantially negatively affecting the primary optical performance of the diffractive optical element.

The method according to the present invention can be performed by using processes and equipments as such known in the field of micro-optics. Preferable choices are the different replication processes. In replication processes, a large number of individual diffractive elements can be formed on a common film by using a particularly configured press tool and proper conditions to facilitate formation of the grating structure. For example, in a straightforward approach, the method according to the present invention can comprise taking a ready-colored commercially available film and forming the desired grating geometry thereon by hot embossing. One very preferred type of replication processes is formed by the different variations of roll-to-roll (or reel-to-reel) processes conventionally known from printing industry.

Preferably, the optical element is formed as a thin film structure having a thickness of less than or equal to 1 mm. In addition to the low thickness and thus low material consumption and small overall size of the component, thin films also enable use of the most efficient replication processes, including the roll-to-roll ones.

In a particularly preferred embodiment, the method comprises the steps of:
  providing an optically clear base film;
  spreading substantially liquid curable grating material on the base film;
  forming an overlaying film comprising a predetermined surface relief micro-grating by bringing the base film having the grating material thereon in contact with a pressing surface configured according to the predetermined micro-grating and providing curing conditions in the volume between the pressing surface and the base film in order to at least partially cure the grating material; and
  separating the pressing surface from the at least partially cured grating material.

In addition, color agent is added in this embodiment to the grating material before spreading it on the base film.

The core of the embodiment determined above lies in the idea of mixing color agent to the substantially liquid grating material before spreading it on the base film. The color agent colors the preferably initially optically clear, i.e. transparent and non-colored grating material.

The base and the overlaying film materials and thicknesses can be selected according to the principles described above relating to the optical element aspect of the present invention.

As stated above, the grating material can be, in principle, any known material suitable for forming diffraction grating structures by e.g. screen printing, flexo printing or offset printing processes. However, several conditions are preferably met by the selected material. First, naturally the selected material has to be suitable for adding a color agent therein. This is not a problem because there are commercially available a great variety of curable lacquers with a wide range of compatible coloring additives for adjusting the coloring of the lacquer. On the other hand, there are also commercially available ready-colored substances suitable for serving as the grating material, wherein the color agent has been added already in manufacturing of the substance. A preferable choice is a material, the coloring of which can be freely adjusted, also by mixing different tones and colors. Further, it is preferable that the grating material is sufficiently hard to prevent formation of scratches on the grating surface. The more rapidly the grating material is curable, the more efficient production of diffractive elements is possible. Flexibility of the cured grating material facilitates separation of the individual diffractive elements from the film on which they are formed. In a roll to roll process, flexibility of the cured grating material as well as the base film is necessary. The grating material should also be chemically resistive against wearing due to different kinds of ambient conditions and/or substances. In addition, the grating material should be free of dissolvents. A very important material selection criterion is that a good adhesion between the base film and the grating material should be achievable.

The initially liquid grating material can be curable e.g. by heat. However, in a preferred embodiment of the method, the grating material is cured by means of ultraviolet UV light. In UV curable materials, the lacquer and the colored pigment are chemically bonded together, thus improving the dispersion and mechanical properties between the lacquer and the pigments. This results in smooth and homogenous coloring and permanent composition of the grating material. The latter can be further enhanced by using UV and sunlight resistant pigments. Moreover, UV embossing is a cold process meaning that no undesirable heat-induced material changes are occurred in the process.

It is also possible to use materials curable via a two-stage process where a preliminary curing, determining the grating surface structure, takes place at the presence of UV light, after which the final curing in the portions of the structure not accessible by light is effected later by moisture of air.

BRIEF DESCRIPTION OF THE FIGURES

The present invention is described in more detail in the following by means of the preferred embodiments of the present invention illustrated in the accompanying figures.

FIG. 1 illustrates as a schematic graph the principles of manufacturing colored lenses according to the present invention.

FIGS. 2-6 show test results of a colored lens according to the present invention.

DETAILED DESCRIPTION OF THE PRESENT INVENTION

Figure 5:
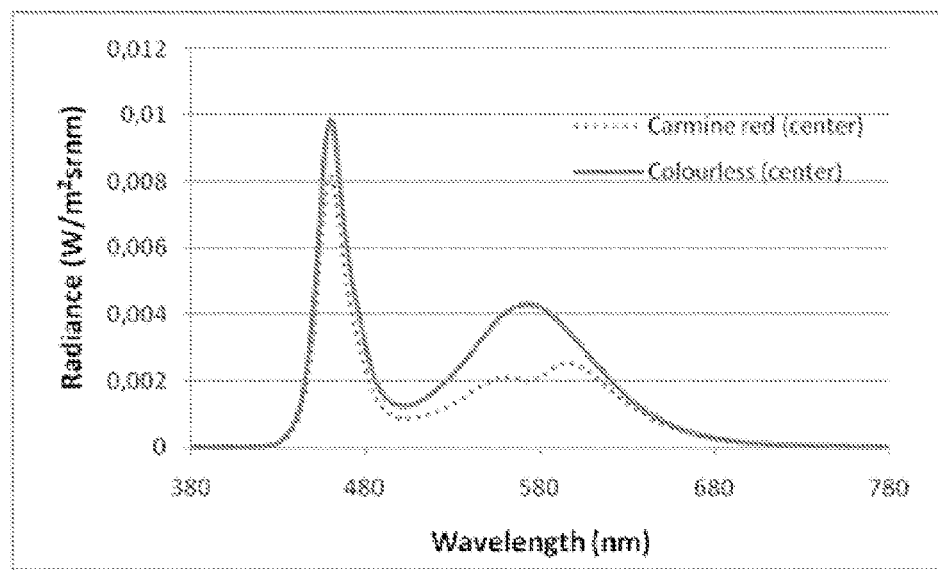

The method illustrated in FIG. 1 starts with providing a transparent and clear base film 1 to serve as a supporting layer of the final optical elements. The material of the base film can be e.g. polycarbonate PC, polyethylene terephthalate PET, polymethylmethacrylate PMMA, polyvinylchloride PVC, glycol-modified polyethylene terephthalate copolyester PETG, cyclo-olefin polymer COP, cyclo-olefin copolymer COC, polyurethane PU, polypropylene PP, polyethylene PE, polystyrene PS, polysulfone PSU, polymethylpentene PMP or triacetyl cellulose TAC. The thickness of the base film can lie in the range of 50-600 µm. The base film can comprise one or more additional layers for e.g. protective and/or adhesion purposes. Optically clear, i.e. a non-colored liquid UV curable thermosetting resin 2 is then provided as a material to finally form a grating layer of the diffractive lens. Color agent 3 is added to the thermosetting resin to form a colored mixture. Alternatively, a colored thermosetting resin already comprising color agent could be used. The colored thermosetting resin 4 is sprayed on the base film to form thereon an overlaying film 5 having a layer thickness of e.g. 10 µm. The base film having the colored thermosetting resin thereon is then fed over a pressing roll 6 having a replication tool 7 attached thereon. The replication tool has an array of surface structures configured according to the desired grating of the lenses to be produced. UV light beam 8 is directed to the contact area of the base film and the pressing roll so that the thermosetting resin in the volume between the pressing roll and the base film is cured. As the pressing roll rotates, the base film having the cured grating structures 9 thereon is separated from the roll and fed forward and possibly wrapped on a storage roll (not shown in FIG. 1). Finally, the two-layered film 1, 5 is cut into separate lenses (not shown in FIG. 1).

To prove the feasibility of the present invention, colored flashlight lenses for a LED-based flashlight arrangement were designed and fabricated by a UV roll to roll process. The base layer was formed by a clear polycarbonate film having a thickness of 0.175 mm. An overprint varnish Marabu UVRS910 and a printing ink Marabu UVRS934 (Carmine Red) were used as the grating material and the color agent, respectively. The colored overprint varnish was applied on the PC film as a layer having a thickness of 5 µm. A mercury lamp was used to produce an illuminating power of 160 W/cm² at the contact area of the pressing roll and the film which was fed through the pressing point at a speed of 15 m/min. FIG. 2 shows a scanning electron microscope (SEM) figure of the cross section of a colored lens 10 fabricated in the process. Reference lenses were fabricated similarly but without adding printing ink to the overprint varnish.

Transmission spectra of a colored and a reference lens were measured by a spectrophotometer Perkin Elmer Lambda 25. FIG. 3 shows the measured spectral curves. As the curves clearly show, the printing ink added to the overprint varnish caused a clear decrease in the transmission at the red wavelengths, thus making the lens colored.

Figure 6:
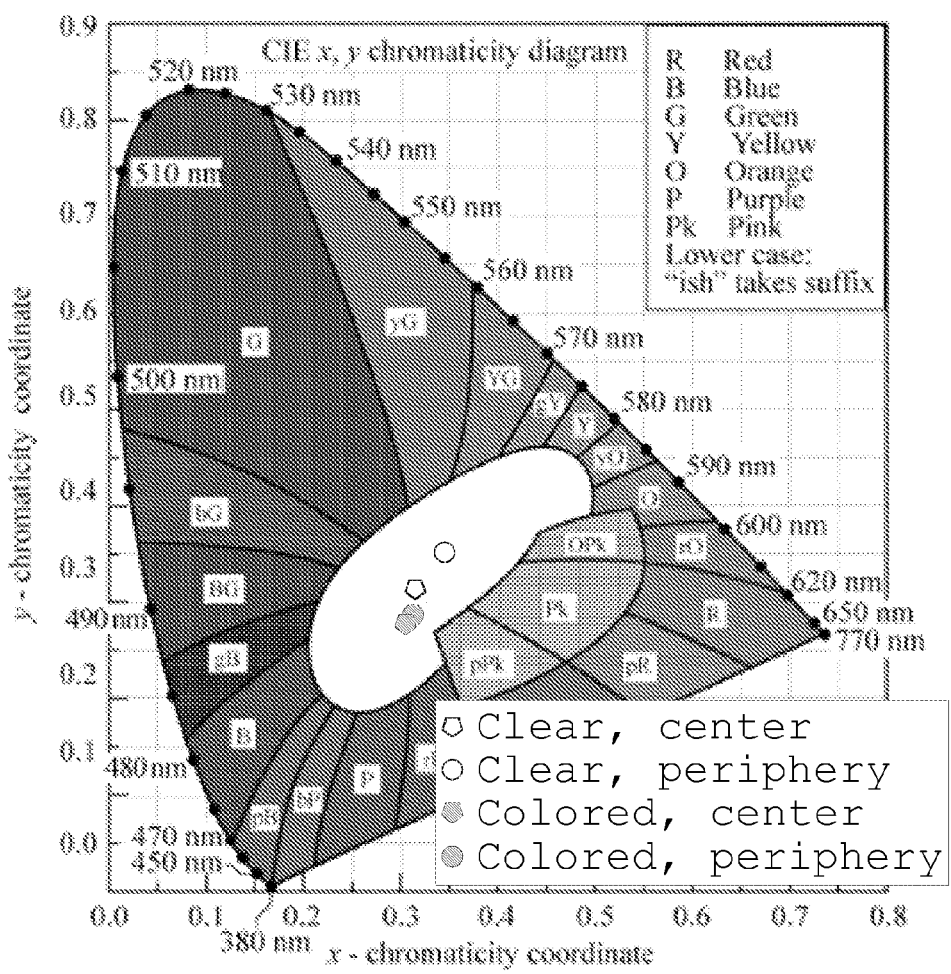

The effect of the coloredness of the flashlight lens of FIG. 2 was investigated by means of a setup simulating a LED-based flashlight arrangement. The setup 11 is illustrated in FIG. 4. A white LED 12 was used as a primary light generating element of the setup. The flashlight lens 10 was set in front of the LED at a distance of 0.6 mm therefrom to collect and redistribute the light 13 emitted by the LED. This kind of arrangement corresponds to the typical LED-based flashlight arrangements e.g. in mobile phones. The light 14 redistributed by the lens was aligned towards a white reference surface 15. The distance between the LED and the reference surface was 100 mm. To determine the coloredness of the light reflected from the reference surface, the radiance spectrum thereof was first measured by a radiometer Konica Minolta CS 2000. FIG. 5 shows the radiance spectra measured at the center of the illuminated area with a colored and with a reference lens. As is seen in the graphs of FIG. 5, the LED was emitting at a wavelength range of about 420-720 nm. For both lenses, the radiance spectrum was measured also at the periphery of the illuminated area. Based on the measured radiance spectra, the color coordinates according to the CIELAB system were then calculated for each of the four cases. FIG. 6 shows this way determined colors located on a CIE chromaticity diagram (CIELAB 1931 chromaticity diagram, adopted from www.lightemittingdiodes.org). The white domain area, i.e. the colors perceived by a human eye as white, lies in the center of this diagram. This white domain area allows some variation both in the spectrum and in the intensity of the light. In the field of color optics, clean white, the so called equal energy white, is determined to lie at the point x=0.38, y=0.38, the brightness being at maximum.

One can observe in FIG. 5 that though slightly shifted with respect to the results measured with the clear reference lens, the measured coloredness of the illumination produced by the colored lens is well within the white domain area of the diagram. In other words, this kind of lens, which clearly is colored when observed when the LED is not operating, can be used in a flashlight arrangement to redistribute the light of a white LED without destroying the whiteness of the flashlight. In addition, with the colored lens, the measured points at the center and at the periphery of the illuminated area are closer to each other than the respective points measured with the clear lens. In other words, the color difference between the center and the periphery of the illuminated area is smaller. This is assumed to result from absorption of the initially slightly yellowish light at the periphery of the light beam of the LED in the colored grating material.

It is important to note that the present invention is not limited to the examples above. Instead, the embodiments of the present invention can freely vary within the scope of the claims.

The invention claimed is:
1. A transmission type optical element comprising:
   a surface relief micro-grating for guiding light propagating through the optical element;
   an optically clear base layer; and an overlaying layer lying on the base layer;
wherein the micro-grating is formed on the surface of the overlying layer opposite to the surface facing towards the base layer, the overlaying layer material including a color agent so as to make the optical element colored.

2. An optical element according to claim 1, wherein the optical element is formed as a thin film structure having a thickness of less than or equal to 1 millimeter (mm).

3. A transmission type optical element comprising:
a surface relief micro-grating for guiding light propagating through the optical element, wherein at least a portion of the thickness of the optical element is formed of a colored material so as to make the optical element colored;
an optically clear base layer; and
an overlaying layer lying on the base layer, the micro-grating being formed on the surface of the overlaying layer opposite to the surface facing towards the base layer, the overlaying layer material comprising color agent so as to make the optical element colored.

4. A lighting arrangement comprising a light generating element and a lens for redistributing the light emitted by the light generating element, characterized in that wherein the lens comprises an optical element according to claim 1.

5. A lighting arrangement according to claim 4, wherein the light generating element comprises a light emitting diode (LED).

6. A lighting arrangement according to claim 4, wherein the light generating element is configured to produce white light and the thickness of at least a portion of the optical element formed of a colored material and the color intensity of this portion are selected to preserve the color of light redistributed by the lens white.

7. A lighting arrangement according to claim 4, wherein the lighting arrangement is a light emitting diode (LED)-based flashlight arrangement.

8. A method for manufacturing a transmission type micro-optical element, the method comprising:
forming a surface relief micro-grating for guiding light propagating through the optical element, wherein at least a portion of the thickness of the optical element is formed of a colored material so as to make the optical element colored;
providing an optically clear base film;
forming an overlaying film on the clear base film, the overlaying film comprising the surface relief micro-grating on the surface of the overlying layer opposite to the surface facing towards the base layer; and
adding a color agent to the overlaying film so as to make the optical element colored.

9. A method according to claim 8, wherein the optical element is formed as a thin film structure having a thickness of less than or equal to 1 millimeter (mm).

10. A method according to claim 8, wherein the method comprises the steps of:
spreading substantially liquid curable grating material on the base film;
forming an overlaying film comprising a predetermined surface relief micro-grating by bringing the base film having the grating material thereon in contact with a pressing surface configured according to the predetermined micro-grating and providing curing conditions in the volume between the pressing surface and the base film in order to at least partially cure the grating material; and
separating the pressing surface from the at least partially cured grating material, and wherein color agent is added to the grating material before spreading it on the base film.

11. A method according to claim 8, wherein the grating material is cured by means of ultraviolet (UV) light.

12. The optical element according to claim 1, wherein the color agent is a substance which, when present in the overlaying layer material, only affects optical properties of the overlaying layer material.

13. The optical element according to claim 1, wherein the color agent is an ink.

14. The optical element according to claim 1, wherein the type and the amount of the color agent determine the colordness of the optical element.

15. The optical element according to claim 3, wherein the color agent is a substance which, when present in the overlaying layer material, only affects optical properties of the overlaying layer material.

16. The optical element according to claim 3, wherein the color agent is an ink.

17. The optical element according to claim 3, wherein the type and the amount of the color agent determine the colordness of the optical element.

18. The method according to claim 8, wherein the color agent is a substance which, when present in the material of the overlaying film, only affects optical properties of the overlaying film material.

19. The method according to claim 8, wherein the color agent is an ink.

20. The method according to claim 8, wherein the colordness of the optical element is defined by the type and the amount of the color agent added to the overlaying film.

* * * * *